United States Patent
Futa et al.

(10) Patent No.: US 8,739,811 B2
(45) Date of Patent: Jun. 3, 2014

(54) DIRECT METERING FUEL SYSTEM WITH CONSTANT SERVO FLOW

(75) Inventors: Paul Futa, North Liberty, IN (US); David Tuttle, South Bend, IN (US); William Scott Rowan, South Bend, IN (US)

(73) Assignee: Honeywell International Inc., Morristown, NJ (US)

( * ) Notice: Subject to any disclaimer, the term of this patent is extended or adjusted under 35 U.S.C. 154(b) by 618 days.

(21) Appl. No.: 13/022,296

(22) Filed: Feb. 7, 2011

(65) Prior Publication Data

US 2012/0199206 A1    Aug. 9, 2012

(51) Int. Cl.
F02C 9/52 (2006.01)
F02C 9/38 (2006.01)
F02C 7/232 (2006.01)
G05D 7/01 (2006.01)
F15B 13/06 (2006.01)
F04B 49/24 (2006.01)
G05D 16/10 (2006.01)

(52) U.S. Cl.
USPC ............ 137/115.06; 137/115.08; 137/505.15; 137/118.04; 60/39.281; 60/734

(58) Field of Classification Search
USPC ............... 137/115.6, 115.18, 118.04, 505.15, 137/505.18, 505, 505.14, 115.06; 60/39.281, 286, 734
See application file for complete search history.

(56) References Cited

U.S. PATENT DOCUMENTS

| | | | |
|---|---|---|---|
| 3,033,221 A | 5/1962 | Strader | |
| 3,744,508 A | 7/1973 | Hansen et al. | |
| 4,760,696 A | 8/1988 | Rooks et al. | |
| 5,463,863 A * | 11/1995 | Severn et al. | 60/773 |
| 5,845,484 A | 12/1998 | Maker | |
| 6,321,527 B1 | 11/2001 | Dyer et al. | |
| 6,666,015 B2 | 12/2003 | Dyer | |
| 6,994,102 B2 | 2/2006 | Yamaguchi et al. | |
| 2001/0025482 A1 * | 10/2001 | Futa et al. | 60/39.281 |
| 2004/0011052 A1 | 1/2004 | Clements | |
| 2006/0130455 A1 * | 6/2006 | Griffiths | 60/39.281 |
| 2009/0235631 A1 * | 9/2009 | Bocquet et al. | 60/39.08 |
| 2009/0320937 A1 | 12/2009 | Arnett | |
| 2010/0064657 A1 | 3/2010 | Mahoney et al. | |

FOREIGN PATENT DOCUMENTS

EP       2500551 A2      9/2012

OTHER PUBLICATIONS

EP Office Action, EP 12 153 951.4 dated Jul. 16, 2013.
EP Search Report, EP 12153951.4-1610/2485109 dated Jan. 7, 2013.

* cited by examiner

*Primary Examiner* — Atif Chaudry
(74) *Attorney, Agent, or Firm* — Ingrassia Fisher & Lorenz, P.C.

(57) ABSTRACT

A direct metering fuel supply system includes a fuel pump, a burn flow fuel line, a servo flow fuel line, and a servo regulator. The fuel pump is adapted receive pump commands representative of a commanded fuel flow rate and is configured, in response to the pump commands, to discharge fuel at the commanded fuel flow rate. The burn flow fuel line is in fluid communication with the pump to receive a first portion of the fuel discharged therefrom. The servo flow fuel line is in fluid communication with the pump to receive a second portion of the fuel discharged therefrom. The servo regulator is mounted on the servo flow fuel line and configured to maintain fuel flow rate in the servo flow fuel line at a substantially constant fuel flow rate regardless of fuel flow rate in the burn flow fuel line.

19 Claims, 4 Drawing Sheets

DIRECT METERING FUEL SYSTEM WITH CONSTANT SERVO FLOW

TECHNICAL FIELD

This disclosure generally relates to fuel metering systems and, more particularly, to a direct metering fuel system with a constant servo flow draw.

BACKGROUND

Many gas turbine engine fuel supply systems include a fuel source, such as a fuel tank, and one or more pumps that draw fuel from the fuel source and deliver pressurized fuel to the fuel manifolds in the engine combustor via a main supply line. The main supply line may include one or more valves in flow series between the pumps and the fuel manifolds. These valves generally include, for example, a main metering valve and a pressurizing-and-shutoff valve downstream of the main metering valve. In addition to the main supply line, many fuel supply systems also include a bypass flow line connected upstream of the metering valve that bypasses a portion of the fuel flowing in the main supply line back to the inlet of the one or more pumps, via a bypass valve. The position of the bypass valve is typically controlled by a head regulation scheme to maintain a substantially fixed differential pressure across the main metering valve.

The above-described fuel supply system is generally safe, reliable, and robust. Nonetheless, it can suffer certain drawbacks. For example, the metering valve and bypass valve can add to overall system weight and complexity. Moreover, control of the metering valve and bypass valve can result in increased system complexity and cost. Thus, in recent years there has been a desire to implement more direct metering fuel control systems. In such systems fuel flow rate is controlled by controlling a fuel metering pump. For example, the speed or the displacement of the fuel metering pump may be controlled. Yet, efforts to implement direct fuel metering control systems have also been impeded by certain drawbacks. For example, many gas turbine engines include one or more fluid-operated actuators. In many instances these actuators are driven by the fuel from the fuel supply system. Thus, actuator operation can cause a droop in the fuel supplied to the engine, and thus an undesirable engine speed droop. It is also postulated that such fuel supply variations to the engine could yield unpredictable, and potentially less controllable, engine transients.

Hence, there is a need for a system and method of controlling fuel flow in a direct metering fuel control system that does not cause, or that at least substantially lessens, fuel supply variations to the engine and/or does not yield unpredictable and/or relatively less controllable engine transients. The present disclosure addresses one or more of these needs.

BRIEF SUMMARY

In one embodiment, and by way of example only, a direct metering fuel supply system includes a fuel pump, a burn flow fuel line, a servo flow fuel line, and a servo regulator. The fuel pump includes a pump inlet and a pump outlet. The fuel pump is adapted receive pump commands representative of a commanded fuel flow rate and is configured, in response to the pump commands, to draw fuel into the pump inlet and discharge fuel out the pump outlet at the commanded fuel flow rate. The burn flow fuel line is in fluid communication with the pump outlet to receive a first portion of the fuel discharged therefrom. The servo flow fuel line is in fluid communication with the pump outlet to receive a second portion of the fuel discharged therefrom. The servo regulator is mounted on the servo flow fuel line and configured to maintain fuel flow rate in the servo flow fuel line at a substantially constant fuel flow rate regardless of fuel flow rate in the burn flow fuel line.

In another embodiment, a direct metering fuel supply system includes a fuel pump, a burn flow fuel line, a servo flow fuel line, and a servo regulator. The fuel pump has a pump inlet and a pump outlet. The fuel pump is configured to be driven at a rotational speed and is operable, upon being driven, to draw fuel into the pump inlet and discharge fuel out the pump outlet at a fuel flow rate that is dependent on the rotational speed. The burn flow fuel line is in fluid communication with the pump outlet to receive a first portion of the fuel discharged therefrom. The servo flow fuel line is in fluid communication with the pump outlet to receive a second portion of the fuel discharged therefrom. The servo regulator is mounted on the servo flow fuel line and is configured to maintain fuel flow rate in the servo flow fuel line at a substantially constant fuel flow rate regardless of fuel flow rate in the burn flow fuel line.

In yet another embodiment, a method of controlling fuel flow in a direct metered fuel supply system includes discharging fuel from a fuel pump at a commanded fuel flow rate. A first portion of the fuel discharged from the fuel pump is directed into a burn flow fuel line, and a second portion of the fuel discharged from the fuel pump is directed into a servo flow fuel line. Fuel flow rate in the servo flow fuel line is maintained at a substantially constant fuel flow rate regardless of fuel flow rate in the burn flow fuel line.

Furthermore, other desirable features and characteristics will become apparent from the subsequent detailed description and the appended claims, taken in conjunction with the accompanying drawings and the preceding background.

BRIEF DESCRIPTION OF THE DRAWINGS

The embodiments will hereinafter be described in conjunction with the following drawing figures, wherein like numerals denote like elements, and wherein.

DETAILED DESCRIPTION

The following detailed description is merely exemplary in nature and is not intended to limit any of the applications and uses disclosed herein. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the embodiments and not to limit the scope of the invention which is defined by the claims. Furthermore, there is no intention to be bound by any expressed or implied theory presented in the preceding technical field, background, brief summary, or the following detailed description. In this regard, although embodiments are described as being implemented in an aircraft, it will be appreciated that the invention may be implemented in numerous and varied end-use environments where fuel flow to a gas turbine engine is controlled.

Figure 1:
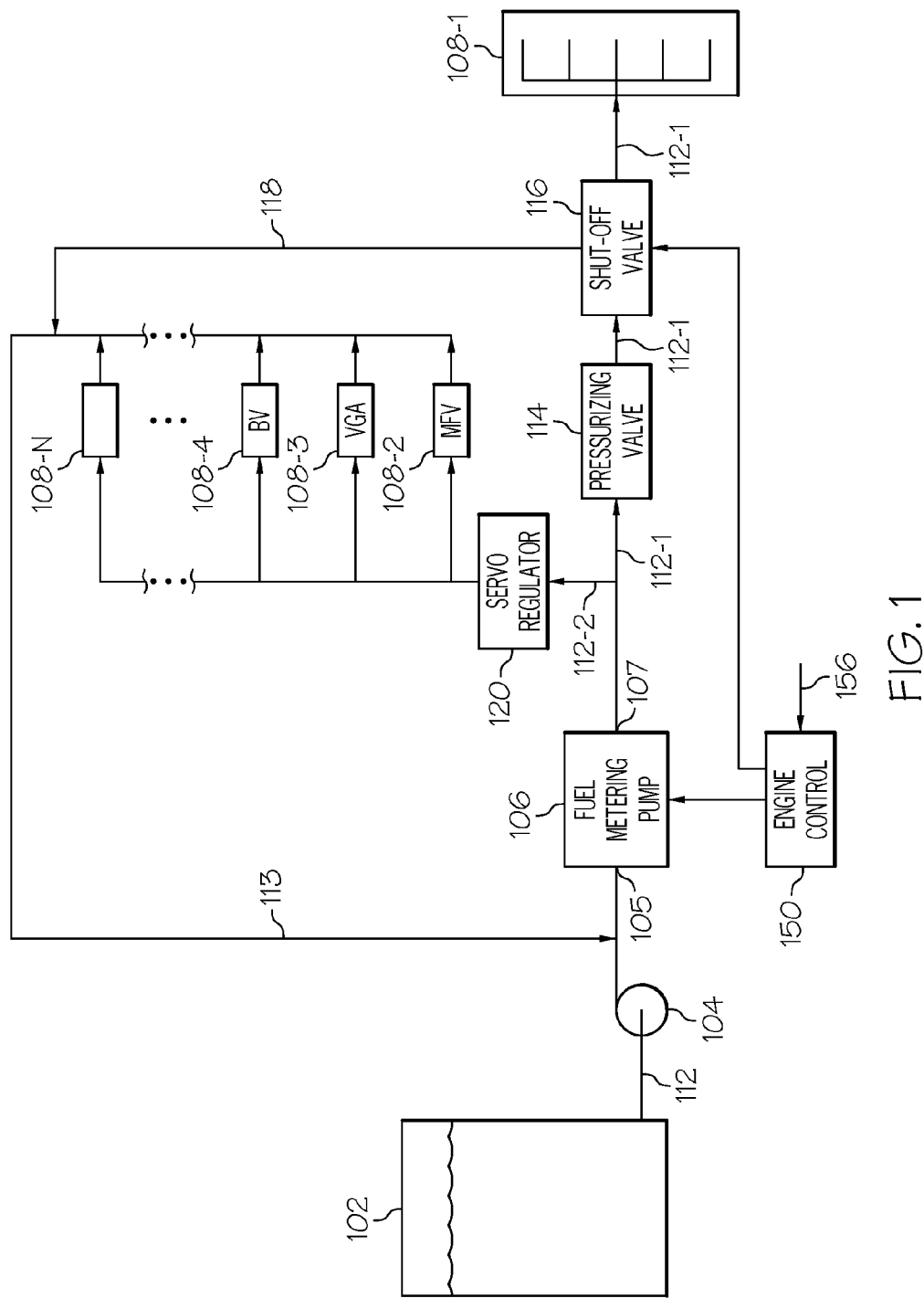
FIG. 1 is a simplified schematic diagram of an exemplary embodiment of a fuel delivery and control system for a gas turbine engine.

A simplified schematic diagram of one embodiment of a direct metering fuel control system 100 for a gas turbine engine, such as a turbofan jet aircraft engine, is depicted in FIG. 1. The system 100 includes a fuel source 102, one or more pumps 104, 106, and an engine control 150. The fuel source 102, which is preferably implemented as one or more tanks, stores fuel that is to be supplied to a plurality of fuel loads 108 (e.g. 108-1, 108-2, 108-3, . . . 108-N). It will be appreciated that the number and type of fuel loads may vary, and may include a gas turbine engine combustor zone and associated nozzles 108-1, and a plurality of other remote devices 108-2, 108-3, 108-4, . . . 108-N. It will be appreciated that the number and type of remote devices may vary. In the depicted embodiment, however, these include a motive flow valve and regulator 108-2, one or more variable geometry actuators 108-3, and one or more bleed valves 108-4, just to name a few. It will additionally be appreciated that the fuel loads 108 may, in some instances, be referred to as primary (or burn flow) fuel loads and secondary (or servo flow) fuel loads based, for example, on functionality. Though the classifications may vary, the gas turbine engine combustor zone and associated nozzles 108-1 are typically classified as primary (or burn flow) fuel loads, and the remote devices 108-2, 108-3, 108-4, . . . 108-N, such as the motive flow valve and regulator 108-2, the one or more variable geometry actuators 108-3, and the one or more bleed valves 108-4, are typically classified as secondary (or servo flow) fuel loads.

The one or more pumps 104, 106 are positioned in flow-series in a supply line 112 and take a suction on the fuel source 102. In the depicted embodiment, a boost pump 104, such as a relatively low horsepower centrifugal pump, and a high-pressure fuel metering pump 106 are used. The boost pump 104 draws fuel directly from the fuel source 102 and provides sufficient suction head for the fuel metering pump 106. The boost pump 104 may be either mechanically driven by the engine, or electrically driven by a non-illustrated motor. Although not depicted, it will be appreciated that the system 100 may additionally include a low pressure pump within the fuel tank(s) 102 to supply fuel to the boost pump 104. Moreover, the boost pump 104 may, in some embodiments, not be included.

The fuel metering pump 106 includes a pump inlet 105 and a pump outlet 107, and is coupled to receive pump commands representative of a commanded fuel flow rate from the engine control 150. The fuel metering pump 106 is configured, in response to the pump commands, to draw fuel into the pump inlet 105 and discharge fuel, at the commanded fuel flow rate and at a relatively high pump discharge pressure, out the pump outlet 107. The fuel metering pump 106 may be variously configured and implemented. For example, the fuel metering pump 106 may be a positive displacement piston, gear, or vane pump. The positive displacement pump may be either a variable displacement pump or a fixed displacement pump. In one particular embodiment, the fuel metering pump 106 is implemented as an electric motor driven fixed displacement pump.

The engine control 150, which may be implemented within an engine controller, such as a Full Authority Digital Engine Controller (FADEC) or other electronic engine controller (EEC), controls the flow rate of fuel to the fuel loads 108. To do so, the engine control 150 receives various input signals and controls the operation of the fuel metering pump 106, and thus the fuel flow rate, accordingly. In the depicted embodiment, the engine control 150 receives an engine speed command signal 152, which is representative of a desired engine speed, from non-illustrated throttle control equipment in, for example, a non-illustrated cockpit. The engine control 150 is configured, in response to the engine speed command signal 152, to determine the fuel flow rate needed by the fuel loads 108. The engine control 150, based on this determination, supplies the pump commands to the fuel metering pump 106 to supply the combined fuel flow rate needed by fuel loads 108. Preferably, the engine control 150 is configured as a multi-channel device, in which one channel is operable and the remaining channels are in a standby mode. Although the number of channels may vary, in a particular preferred embodiment, the engine control 150 includes two independent channels.

The supply line 112 is coupled to the fuel source 102 and, via the one or more pumps 104, 106, delivers the fuel to the fuel loads 108. It is noted that the supply line 112 is, for convenience, depicted and described as including a burn flow fuel line 112-1 and a servo flow fuel line 112-2. The burn flow fuel line 112-1 is in fluid communication with, and receives a first portion of the fuel discharged from, the pump outlet 107, and delivers the first portion of the fuel to the primary (or burn flow) fuel loads (e.g., 108-1). The servo flow fuel line 112-2 is in fluid communication with, and receives a second portion of the fuel discharged from, the pump outlet 107, and delivers at least part of the second portion of fuel to the secondary (or servo flow) fuel loads (e.g., 108-2, 108-3, 108-4 . . . 108-N). As FIG. 1 further depicts, the system 100 includes a servo flow return line 113. The servo flow return line 113 is in fluid communication with the remote devices 108-2, 108-3, 108-4 . . . 108-N and the pump inlet 105, and returns an equivalent amount of fuel that is supplied to the remote devices 108-2, 108-3, 108-4 . . . 108-N back to the pump inlet 105.

The depicted direct metering fuel control system 100 additionally includes a pressurizing valve 114, a shut-off valve 116, and a servo regulator 120. The pressurizing valve 114 and the shut-off valve 116 are mounted on the burn flow line 112-1. The pressurizing valve 114 functions to ensure there is a minimum system pressure magnitude in the burn flow line 112-1. The shut-off valve 116, which is preferably an electrically actuated valve, is commanded by the engine control 150. The shut-off valve 116, in response to commands supplied from the engine control 150, either allows fuel to flow to the engine via the burn flow fuel line 112-1, or directs fuel flow back to the pump inlet 105 via the burn flow return line 118 and the servo return line 113. The servo regulator 120 is mounted on the servo flow line 112-2 and is configured to maintain fuel flow rate in the servo flow fuel line 112-2 at a substantially constant fuel flow rate, regardless of the fuel flow rate in the burn flow fuel line 112-1. Although the servo regulator 120 may be variously configured to implement this functionality, one particular implementation is illustrated in FIG. 2, and with reference thereto it, and other system components, will be described.

Figure 2:
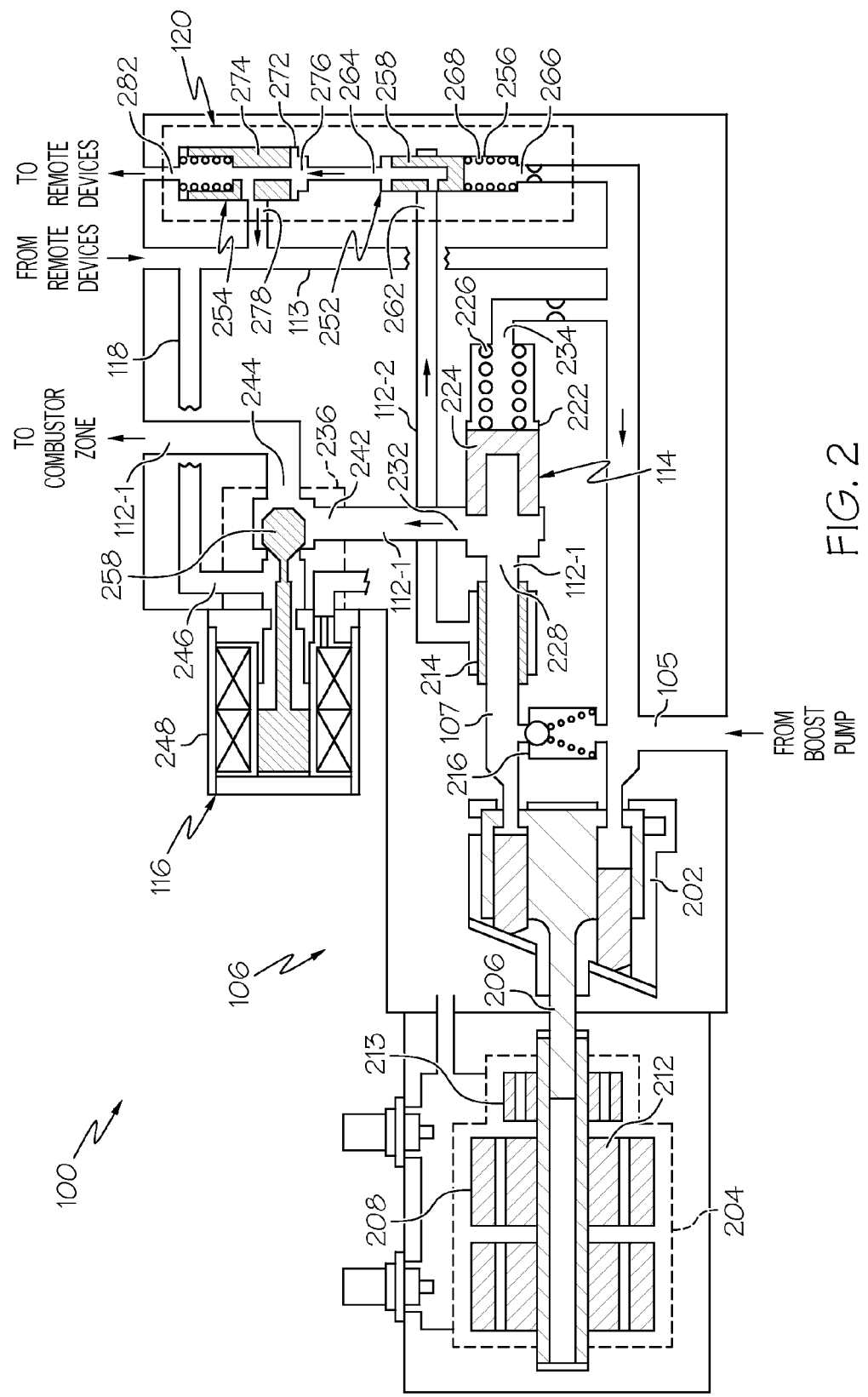
FIG. 2 is a schematic representation of an exemplary embodiment of a portion of a fuel supply system that may be used to implement the system of FIG. 1.

A slightly more detailed schematic representation of a portion of the fuel supply system 100 of FIG. 1 is illustrated in FIG. 2, and further depicts the servo regulator 120 in more detail. It should be noted that like reference numerals in FIGS. 1 and 2 refer to like parts and components. In the depicted embodiment, the fuel metering pump 106 includes a pump 202 and a motor 204. The pump 202 is coupled to the motor 204 and, in response to a drive torque supplied thereto from the motor 204, draws fuel into the pump inlet 105 and discharges fuel, at the commanded fuel flow rate and at a relatively high pump discharge pressure, out the pump outlet 107. The depicted pump 202 is a fixed displacement, variable speed positive displacement piston pump, and includes a pump rotor (or shaft) 206 that is coupled to the motor 204. As is generally known, a fixed displacement, variable speed positive displacement piston pump exhibits generally linear flow versus drive speed characteristics. Thus, the flow rate at which the pump 202 supplies fuel is controlled based on the drive speed of the motor 204 that is supplying the drive torque.

The depicted motor 204 is implemented as brushless DC motor that includes a stator 208 and a permanent magnet rotor 212. The stator 208 surrounds the permanent magnet rotor 212, which is rotationally mounted via a bearing assembly 213 and is coupled to the pump shaft 206. The permanent magnet rotor 212 and pump shaft 206 thus share the bearing assembly 213. With this type of configuration the stator 208 associated may be selectively energized, using known brushless DC motor commutation techniques, to generate a rotating magnetic field. The rotor 212 will in turn rotate, and supply a drive torque to the pump 202.

The engine control 150 is coupled to the stator 208 and implements, among other functions, appropriate brushless DC motor commutation. It will be appreciated that the motor 204 and the engine control 150 may be configured to implement either sensorless or position feedback motor commutation techniques. No matter the particular commutation technique that is employed, the speed of the motor 204, and the concomitant drive torque supplied by the motor 204 to the pump 202, is controlled such that the pump 202 supplies fuel at the fuel flow rate determined by the engine control 150. It will be appreciated that the motor 204 may be implemented using any one of numerous types of AC or DC motors, and that a brushless DC motor is merely exemplary of one particular embodiment.

The fuel that is discharged from the pump outlet 107 flows into the burn flow fuel line 112-1 and, via a wash filter 214, into the servo flow fuel line 112-2. As FIG. 2 also depicts, a pump relief valve 216 may be disposed between the pump outlet 107 and the pump inlet 105. The pump relief valve 216, if included, is normally closed, which is the position depicted in FIG. 2. However, if a preset fluid pressure is reached at the pump outlet 107, the pump relief valve 216 will open, and relieve the pressure by fluidly communicating the pump outlet 107 to the pump inlet 105.

The fuel in the burn flow fuel line 112-1 will also flow through the pressurizing valve 114, when fuel pressure in the burn flow line 112-1 attains a predetermined minimum fluid pressure. The fuel then flows through the shut-off valve 116, when the shut-off valve 116 is in the position depicted in FIG. 2, and then through burn flow fuel line 112-1 to the gas turbine engine combustor zone and associated nozzles 108-1 (non depicted in FIG. 2). It will be appreciated that the pressurizing valve 114 and the shut-off valve 116 may be variously configured and implemented. For completeness, however, descriptions of the depicted implementations will now be provided.

The pressurizing valve 114 includes a valve body 222, a valve element 224, and a spring 226. The valve body 222 includes an inlet port 228, an outlet port 232, and a sense port 234. The inlet port 228 is in fluid communication with the pump outlet 107, and the sense port 234 is in fluid communication with the pump inlet 105. The valve element 224 and the spring 226 are disposed within the valve body 222. The valve element 224 is configured to move between a closed position, in which the inlet port 228 is fluidly isolated from the outlet port 232, and an open position (which is depicted in FIG. 2), in which the inlet port 228 is in fluid communication with the outlet port 232. The spring 226 is configured to supply a bias force to the valve element 224 that, together with the fluid pressure at the sense port 234, urges the valve element 224 toward the closed position. With this configuration, the pressurizing valve 114, as alluded to above, will remain in the closed position until fluid pressure at the inlet port 228 attains a predetermined minimum opening fluid pressure, at which point it will move to an open flowing position. The position of pressurizing valve element 224 varies the area of discharge outlet port 232, maintaining the fuel pressure in burn flow line 112-1 to the predetermined minimum pressure above pump inlet 105. The pressurizing valve 114 remains open until the fluid pressure at the inlet port 228 falls below a predetermined closing fluid pressure.

The shut-off valve 116 is mounted on the burn flow fuel line 112-1 downstream of the pressurizing valve 114, and includes a valve body 236 and a valve element 238. The valve body 236 includes an inlet port 242, a burn flow outlet port 244, and a bypass outlet port 246. The inlet port 242 in fluid communication with the pressurizing valve outlet port 232, and the bypass outlet port 246 is in fluid communication with the pump inlet 105. The valve element 238 is disposed within the valve body 236 and is coupled to a valve actuator 248. In the depicted embodiment, the valve actuator 248 is implemented using a spring-loaded solenoid. It will be appreciated, however, that the valve actuator 248 could be implemented using any one of numerous suitable actuation devices.

No matter the specific configuration and implementation of the valve actuator 248, it is used to move the valve element 238 between a first position and a second position. In the first position, which is the position depicted in FIG. 2, the inlet port 242 is in fluid communication with the burn flow outlet port 244 and is fluidly isolated from the bypass outlet port 246. In the second position, the inlet port 242 is fluidly isolated from the burn flow outlet port 244 and is in fluid communication with the bypass outlet port 246. With this configuration, when the shut-off valve 116 is in the second position, fuel in the burn flow fuel line 112-1 may, if needed or desired, be bypassed back to the pump inlet 105 via a burn flow return line 118 and the servo flow return line 113.

Turning now to the servo regulator 120, this device, as noted above, is mounted on the servo flow line 112-2 and is configured to maintain fuel flow rate in the servo flow fuel line 112-2 at a substantially constant fuel flow rate, regardless of the fuel flow rate in the burn flow fuel line 112-1. To implement this functionality, the depicted servo regulator 120 includes a servo pressure regulator 252 and a servo flow regulator 254. The depicted servo pressure regulator 252 includes a pressure regulator valve body 256 and a pressure regulator valve element 258. The pressure regulator valve body 256 includes a pressure regulator inlet port 262, a pressure regulator outlet port 264, and a return pressure sense port 266. The pressure regulator inlet port 262 is coupled to receive the second portion of the fuel from the pump outlet 107, and the return pressure sense port 266 is in fluid communication with the pump inlet 105. The servo pressure regulator 252 is configured to discharge fuel from the pressure regulator outlet port 264 at a substantially constant servo fuel pressure above pump inlet/servo return pressure.

The pressure regulator valve element 258 is movably disposed within the pressure regulator valve body 256, and is configured to control fuel flow between the pressure regulator inlet port 262 and the pressure regulator outlet port 264 so that fuel is discharged from the pressure regulator outlet port 264 at a substantially constant servo fuel supply pressure above servo return pressure. A pressure regulator spring element 268 is disposed within the pressure regulator valve body 256 between the return pressure sense port 266 and the pressure regulator valve element 258. The pressure regulator spring element 268 is configured to supply a bias force to the pressure regulator valve element 258 that, together with the fluid pressures at the pressure regulator outlet port 264 and the return pressure sense port 266, controls the position of the pressure regulator valve element 258, and thus the pressure of the fuel discharged from the pressure regulator outlet port 264.

The servo flow regulator 254 also includes a flow regulator valve body 272 and a flow regulator valve element 274. The flow regulator valve body 272 includes a flow regulator inlet port 276, a flow regulator return outlet port 278, and a flow regulator supply outlet port 282. The flow regulator inlet port 276 is in fluid communication with the pressure regulator outlet port 264, the flow regulator return outlet port 278 is in fluid communication with the pump inlet 105 (via the servo flow return line 113), and the flow regulator supply outlet port 282 is in fluid communication with each of the remote devices 108-2, 108-3, 108-4 . . . 108-N.

The flow regulator valve element 274 is movably disposed within the flow regulator valve body 272, and is configured to selectively place the flow regulator inlet port 276 in fluid communication with the flow regulator return outlet port 278, or both the flow regulator return outlet port 278 and the flow regulator supply outlet port 282. As shown more clearly in FIGS. 3 and 4, the flow regulator valve element 274 includes an inner surface 302 that defines a flow passage 304 through the flow regulator valve element 274. The flow passage 304 provides constant fluid communication between the flow regulator inlet port 276 and the flow regulator supply outlet port 282. The flow regulator valve element 274 additionally defines a first flow orifice 306 and a second flow orifice 308. The first flow orifice 306 is configured to restrict flow through the flow passage 304. The second flow orifice 308 extends through flow regulator valve element 274. It is via the second flow orifice 308 that the flow regulator inlet port 276 may be in fluid communication with both the flow regulator return outlet port 278 and the flow regulator supply outlet port 282.

A flow regulator spring element 312 is also disposed within the flow regulator valve body 272 and supplies a bias force that urges the flow regulator valve element 274 to a position in which the flow regulator inlet port 276 is in fluid communication with both the flow regulator return outlet port 278 and the flow regulator supply outlet port 282. The variation in position of the flow regulator valve element 274 maintains the fuel flow rate in the servo flow fuel line 112-2 at the substantially constant fuel flow rate, regardless of fuel flow rate in the burn flow fuel line 112-1.

With the above-described servo flow regulator 254 configuration, fuel discharged from the servo pressure regulator 252 at the substantially constant pressure flows into the flow regulator inlet port 276, into and through the first flow orifice 306, and into the flow passage 304 formed in the flow regulator valve element 274. The fuel is then routed either to the remote devices 108-2, 108-3, 108-4 . . . 108-N or to the servo flow return line 113, depending upon the position of the flow regulator valve element 274. The flow regulator valve element 274 is positioned via the pressure imbalance that is created by flow through the first flow orifice 306, in conjunction with the bias force supplied by the flow regulator spring element 312.

Figure 3:
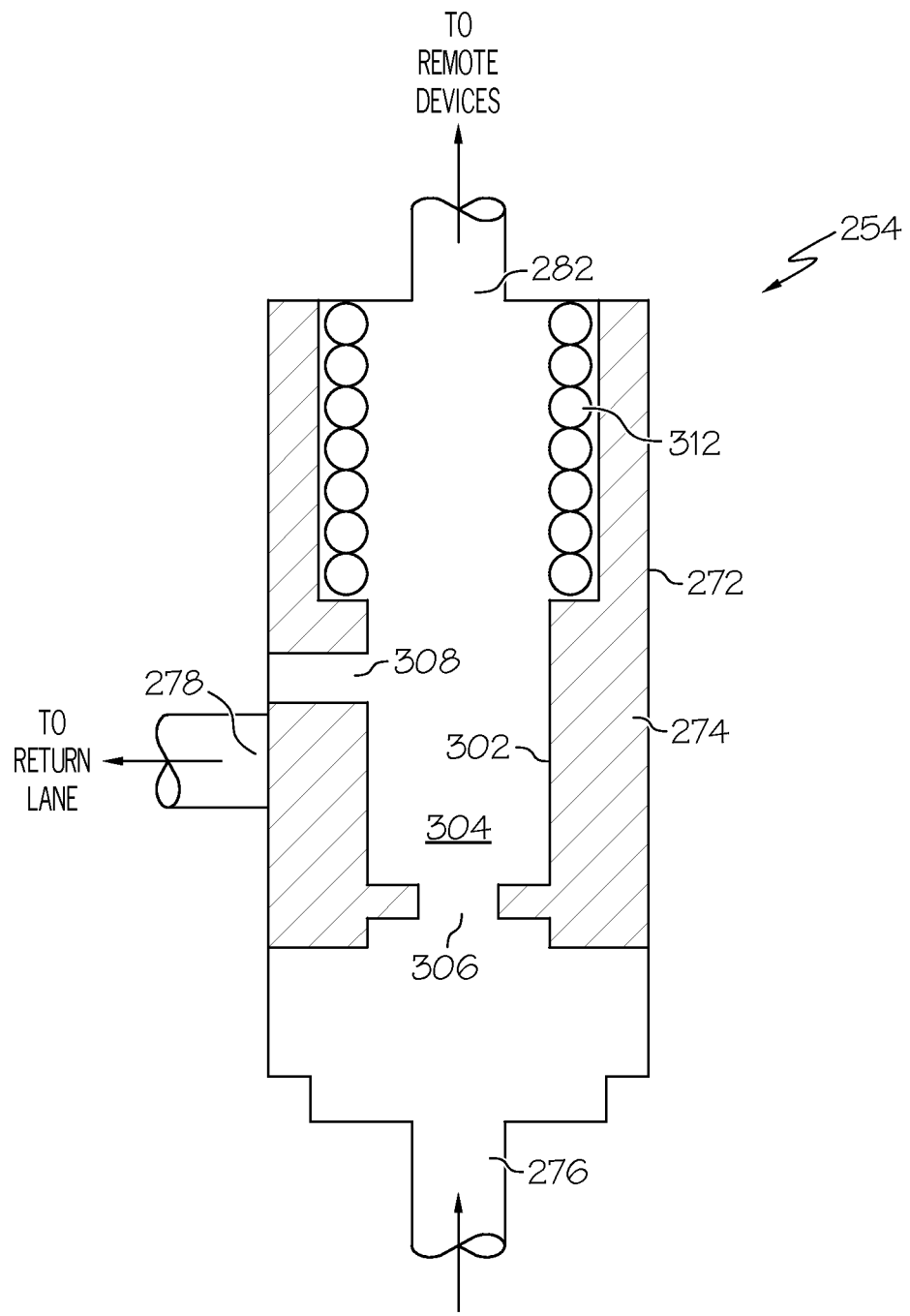
FIGS. 3 and 4 depict schematic representations of the servo flow regulator valve depicted in FIG. 2 in a first position and a second position, respectively.
Figure 4:
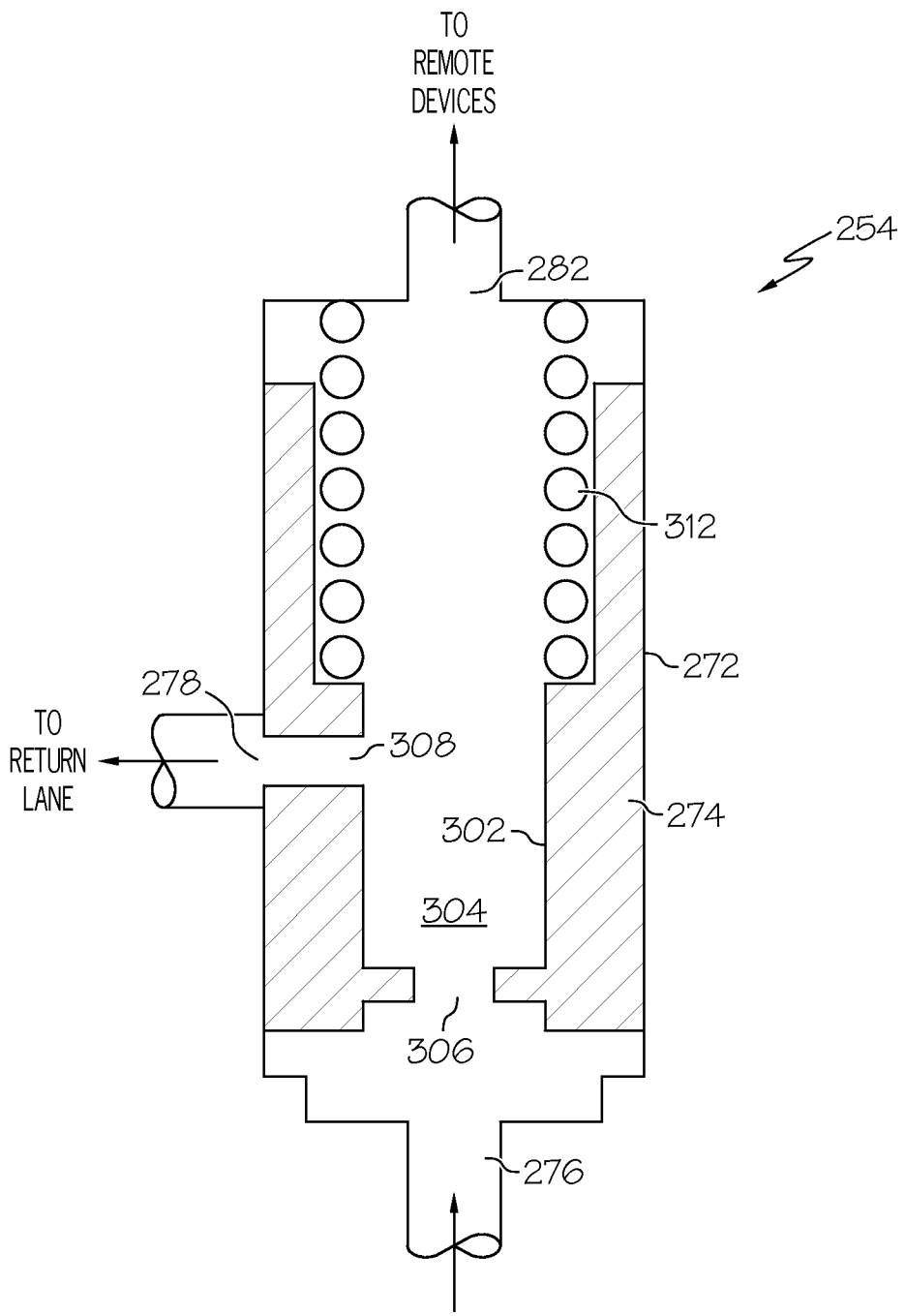

As depicted in FIG. 3, when fuel demand by the remote devices 108-2, 108-3, 108-4 . . . 108-N is relatively high, flow through the first flow orifice 306 creates a pressure imbalance on the flow regulator valve element 274 causing it to move toward the flow regulator supply outlet port 282, thereby compressing the flow regulator spring element 312. As a result, fuel is prevented from flowing through the second flow orifice 308 and out the flow regulator return outlet port 278. Conversely, as depicted in FIG. 4, when fuel demand by the remote devices 108-2, 108-3, 108-4 . . . 108-N is relatively low, the pressure imbalance on the flow regulator valve element 274 due to flow through the first flow orifice 306 decreases, causing the flow regulator valve element 274 to move toward the flow regulator inlet port 276, thereby extending the flow regulator spring element 312. As a result, fuel may flow through the second flow orifice 308 and out the flow regulator return outlet port 278 to the servo flow return line 113. As may be appreciated, when the flow regulator valve element 274 is positioned so that the majority of fuel in the servo flow fuel line 112-2 is being supplied to the remote devices 108-2, 108-3, 108-4 . . . 108-N, an equivalent flow of fuel is being returned from the remote 108-2, 108-3, 108-4 . . . 108-N, via the servo flow return line 113, devices back to pump inlet 105.

The servo regulator 120 described above provides, in conjunction with the servo flow fuel line 112-2 and the servo flow return line 113, a servo flow fuel loop that is in parallel with the metered burn flow being supplied to the gas turbine engine combustor zone and associated nozzles 108-1 via the burn flow fuel line 112-1. The servo regulator 120 supplies a substantially constant fuel flow rate to the remote devices 108-2, 108-3, 108-4 . . . 108-N, or back to pump inlet 105, or both. This substantially constant fuel flow rate can be related to a specific pump speed. For example, if the minimum pump speed (or other pump variable is being controlled) associated with the substantially constant fuel flow rate in the servo fuel flow line 112-2 is 100 RPM, then at 100 RPM fuel flow rate in the burn flow fuel line 112-1 would be 0.0 PPH (pounds per hour). As may be appreciated, the pump speed needed to supply a given fuel flow rate in the burn flow fuel line 112-1 would be increased by 100 RPM to account for the parallel servo flow fuel loop.

It should be noted that the servo regulator 120 will not totally eliminate open loop direct metered flow variation. This is why this description states that the servo regulator maintains the fuel flow rate in the servo flow fuel line 112-2 at a substantially constant fuel flow rate. In this disclosure, the word "substantially" is used as a term of approximation, in that some variation (e.g., droop) of the fuel flow rate in the servo flow fuel line 112-2 may occur during system operation. For example, during some fuel flow transients, the fuel flow rate in the servo flow fuel line 112-1 may vary from the desired constant fuel flow rate in the range of about 5-10 percent. It will be appreciated that the specific amount of variation may depend, at least in part, on the sizing of the valve elements 258, 274 and the spring elements 268, 312 (primarily the spring rates), and on regulated pressure fluctuations.

While at least one exemplary embodiment has been presented in the foregoing detailed description it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing exemplary embodiments. It being understood that various changes may be made in the function and arrangement of elements described in an exemplary embodiment without departing from the scope of the invention as set forth in the appended claims.

What is claimed is:

1. A direct metering fuel supply system, comprising:
   a fuel pump including a pump inlet and a pump outlet, the fuel pump adapted receive pump commands representative of a commanded fuel flow rate and configured, in response to the pump commands, to draw fuel into the pump inlet and discharge fuel out the pump outlet at the commanded fuel flow rate;
   a burn flow fuel line in fluid communication with the pump outlet to receive a first portion of the fuel discharged therefrom;
   a servo flow fuel line in fluid communication with the pump outlet to receive a second portion of the fuel discharged therefrom;
   a servo regulator mounted on the servo flow fuel line and configured to maintain fuel flow rate in the servo flow fuel line at a substantially constant fuel flow rate regardless of fuel flow rate in the burn flow fuel line.

2. The system of claim 1, wherein the servo regulator comprises:
   a servo pressure regulator including a pressure regulator inlet port and a pressure regulator outlet port, the pressure regulator inlet port coupled to receive the second portion of the fuel, the servo pressure regulator configured to discharge fuel from the pressure regulator outlet port at a substantially constant servo fuel pressure; and
   a servo flow regulator including a flow regulator inlet port, a flow regulator return outlet port, and a flow regulator supply outlet port, the flow regulator inlet port in fluid communication with the pressure regulator outlet port to receive the fuel discharged therefrom at the substantially constant servo fuel pressure, the servo flow regulator configured to selectively place the flow regulator inlet port in fluid communication with (i) only the flow regulator supply outlet port or (ii) both the flow regulator return outlet port and the flow regulator supply outlet port.

3. The system of claim 2, wherein the servo pressure regulator further includes a return pressure port in fluid communication with the pump inlet.

4. The system of claim 3, wherein the servo pressure regulator further includes:
   a pressure regulator valve body that includes the pressure regulator inlet port, the pressure regulator outlet port, and the return pressure port;
   a pressure regulator valve element movably disposed within the pressure regulator valve body and configured to control fuel flow between the pressure regulator inlet port and the pressure regulator outlet port so that fuel is discharged from the pressure regulator outlet port at the substantially constant servo fuel pressure; and
   a pressure regulator spring element disposed within the pressure regulator valve body between the return pressure port and the pressure regulator valve element.

5. The system of claim 2, wherein the flow regulator return outlet port is in fluid communication with the pump inlet.

6. The system of claim 5, wherein the servo flow regulator further includes:
   a flow regulator valve body that includes the flow regulator inlet port, the flow regulator return outlet port, and the flow regulator supply outlet port;
   a flow regulator valve element movably disposed within the flow regulator valve body and configured to selectively place the flow regulator inlet port in fluid communication with one or both of the flow regulator return outlet port and the flow regulator supply outlet port; and
   a flow regulator spring element disposed within the flow regulator valve body and supplying a bias force that urges the flow regulator valve element to a position in which fuel is discharged from both the flow regulator return outlet port and the flow regulator supply outlet port.

7. The system of claim 1, wherein the fuel pump comprises a positive displacement pump.

8. The system of claim 7, wherein:
   the positive displacement pump comprises a fixed displacement pump; and
   the system further comprises an electric motor coupled to the fixed displacement pump, the electric motor configured to rotate at a speed that causes the fixed displacement pump to discharge fuel out the pump outlet at the commanded fuel flow rate.

9. The system of claim 7, wherein the positive displacement pump comprises a variable displacement pump.

10. The system of claim 1, further comprising:
    a pressurizing valve mounted on the burn flow fuel line, the pressurizing valve including a pressurizing valve inlet port and a pressurizing valve outlet port, the pressurizing valve inlet port coupled to receive the first portion of the fuel, the pressurizing valve configured to discharge fuel from the pressurizing valve outlet port at a substantially constant burn fuel pressure.

11. The system of claim 10, further comprising:
    a shut-off valve mounted on the burn flow fuel line downstream of the pressurizing valve, the shut-off valve including an inlet port, a burn flow outlet port, a bypass outlet port, and a valve element, the inlet port in fluid communication with the pressurizing valve outlet port, the bypass outlet port in fluid communication with the pump inlet, the valve element movable between a first position and a second position, wherein:
    (i) in the first position, the inlet port is in fluid communication with the burn flow outlet port and fluidly isolated from the bypass outlet port, and
    (ii) in the second position, the inlet port is fluidly isolated from the burn flow outlet port and in fluid communication with the bypass outlet port.

12. A direct metering fuel supply system, comprising:
    a fuel pump having a pump inlet and a pump outlet, the fuel pump configured to be driven at a rotational speed and operable, upon being driven, to draw fuel into the pump inlet and discharge fuel out the pump outlet at a fuel flow rate that is dependent on the rotational speed;
    a burn flow fuel line in fluid communication with the pump outlet to receive a first portion of the fuel discharged therefrom;
    a servo flow fuel line in fluid communication with the pump outlet to receive a second portion of the fuel discharged therefrom; and
    a servo regulator mounted on the servo flow fuel line and configured to maintain fuel flow rate in the servo flow fuel line at a substantially constant fuel flow rate regardless of fuel flow rate in the burn flow fuel line.

13. The system of claim 12, wherein the servo regulator comprises:
    a servo pressure regulator including a pressure regulator inlet port and a pressure regulator outlet port, the pressure regulator inlet port coupled to receive the second portion of the fuel, the servo pressure regulator configured to discharge fuel from the pressure regulator outlet port at a substantially constant servo fuel pressure; and
    a servo flow regulator including a flow regulator inlet port, a flow regulator return outlet port, and a flow regulator supply outlet port, the flow regulator inlet port in fluid communication with the pressure regulator outlet port to receive the fuel discharged therefrom at the substantially constant servo fuel pressure, the servo flow regulator configured to selectively discharge fuel from (i) only the flow regulator supply outlet port or (ii) both the flow regulator return outlet port and the flow regulator supply outlet port.

14. The system of claim 13, wherein the servo pressure regulator comprises:
   a pressure regulator valve body that includes the pressure regulator inlet port, the pressure regulator outlet port, and a return pressure port;
   a pressure regulator valve element movably disposed within the pressure regulator valve body and configured to control fuel flow between the pressure regulator inlet port and the pressure regulator outlet port so that fuel is discharged from the pressure regulator outlet port at the substantially constant servo fuel pressure; and
   a pressure regulator spring element disposed within the pressure regulator valve body between the return pressure port and the pressure regulator valve element.

15. The system of claim 13, wherein the servo flow regulator comprises:
   a flow regulator valve body that includes the flow regulator inlet port, the flow regulator return outlet port, and the flow regulator supply outlet port;
   a flow regulator valve element movably disposed within the flow regulator valve body and configured to selectively place the flow regulator inlet port in fluid communication with one or both of the flow regulator return outlet port and the flow regulator supply outlet port; and
   a flow regulator spring element disposed within the flow regulator valve body and supplying a bias force that urges the flow regulator valve element to a position in which fuel is discharged from both the flow regulator return outlet port and the flow regulator supply outlet port.

16. The system of claim 12, wherein the fuel pump comprises:

a fixed displacement pump; and
an electric motor coupled to the fixed displacement pump, the electric motor configured to rotate at a speed that causes the fixed displacement pump to discharge fuel out the pump outlet at the commanded fuel flow rate.

17. The system of claim 12, further comprising:
a pressurizing valve mounted on the burn flow fuel line, the pressurizing valve including a pressurizing valve inlet port and a pressurizing valve outlet port, the pressurizing valve inlet port coupled to receive the first portion of the fuel, the pressurizing valve configured to discharge fuel from the pressurizing valve outlet port at a substantially constant burn fuel pressure.

18. The system of claim 17, further comprising:
a shut-off valve mounted on the burn flow fuel line downstream of the pressurizing valve, the shut-off valve including an inlet port, a burn flow outlet port, a bypass outlet port, and a valve element, the inlet port in fluid communication with the pressurizing valve outlet port, the bypass outlet port in fluid communication with the pump inlet, the valve element movable between a first position and a second position, wherein:
   (i) in the first position, the inlet port is in fluid communication with the burn flow outlet port and fluidly isolated from the bypass outlet port, and
   (ii) in the second position, the inlet port is fluidly isolated from the burn flow outlet port and in fluid communication with the bypass outlet port.

19. A method of controlling fuel flow in a direct metered fuel supply system, comprising the steps of:
   discharging fuel from a fuel pump at a commanded fuel flow rate;
   directing a first portion of the fuel discharged from the fuel pump into a burn flow fuel line;
   directing a second portion of the fuel discharged from the fuel pump into a servo flow fuel line; and
   maintaining fuel flow rate in the servo flow fuel line at a substantially constant fuel flow rate regardless of fuel flow rate in the burn flow fuel line.

* * * * *